No. 693,455. Patented Feb. 18, 1902.
J. C. W. STANLEY.
DRIER FOR COTTON OR OTHER MATERIALS.
(Application filed Mar. 11, 1901.)
(No Model.) 2 Sheets—Sheet 1.
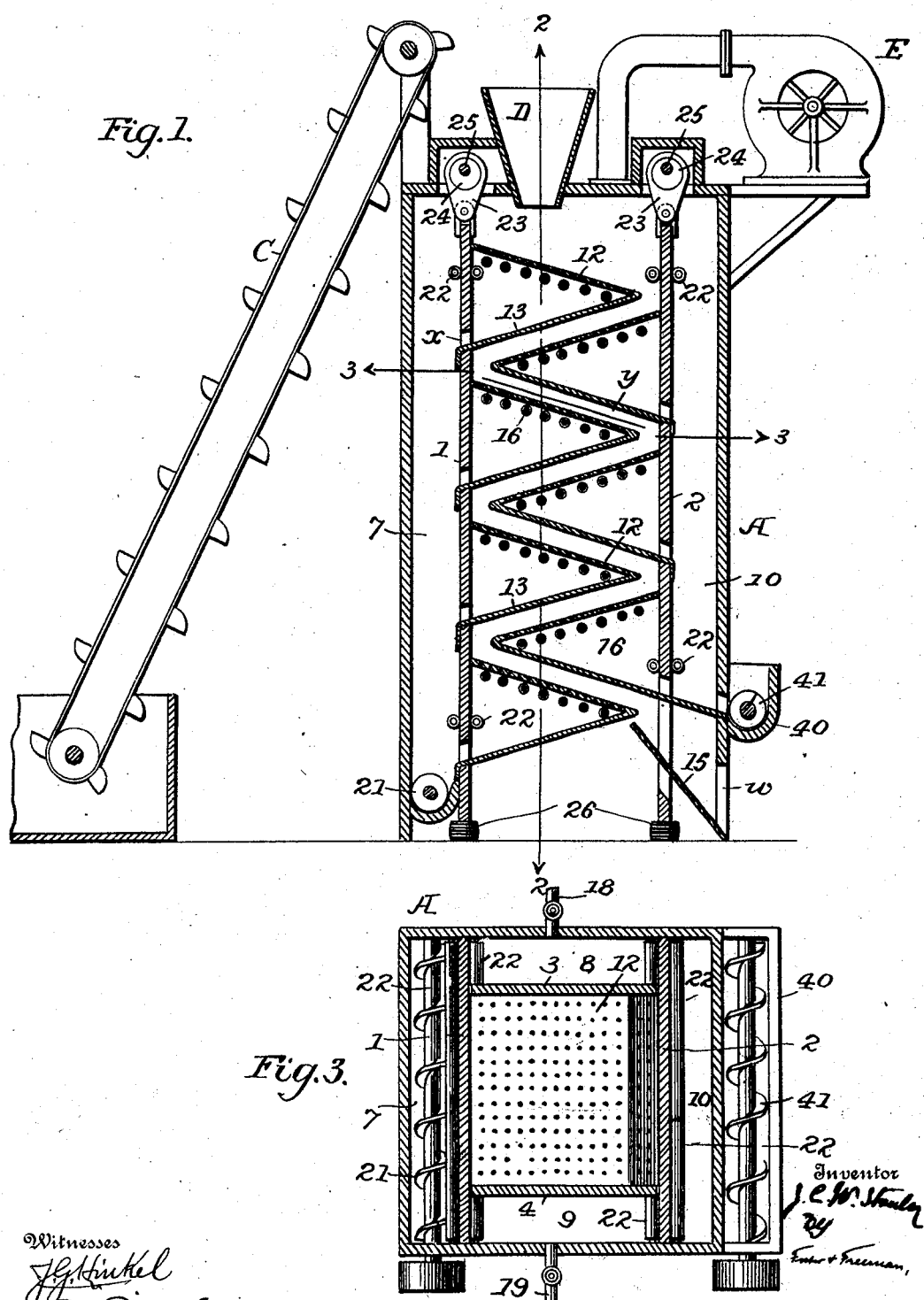

No. 693,455. Patented Feb. 18, 1902.
J. C. W. STANLEY.
DRIER FOR COTTON OR OTHER MATERIALS.
(Application filed Mar. 11, 1901.)
(No Model.) 2 Sheets—Sheet 2.
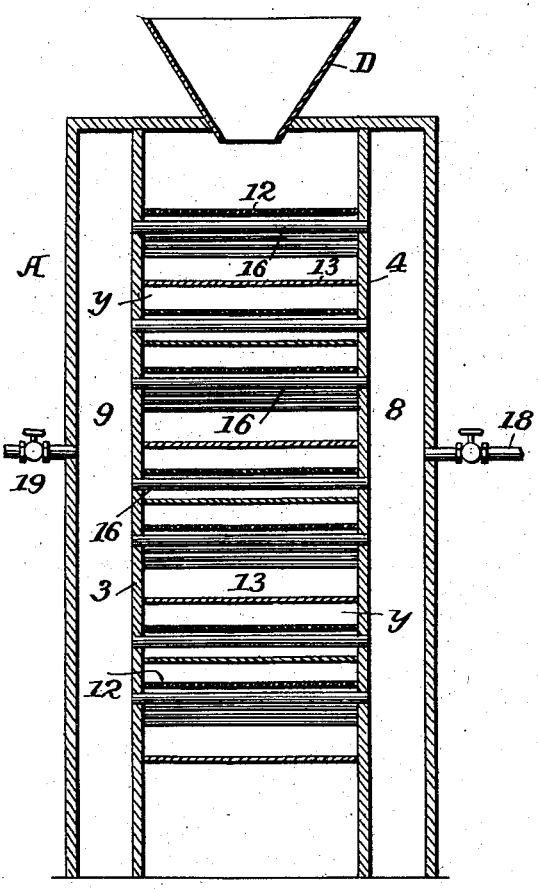
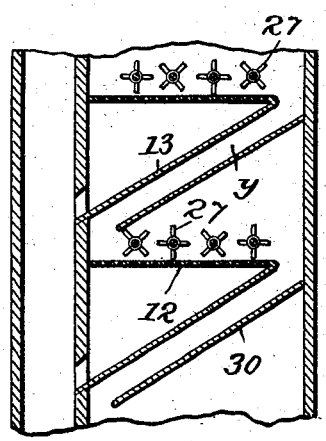

UNITED STATES PATENT OFFICE.

JOHN CHARLES WILLIAM STANLEY, OF LONDON, ENGLAND.

DRIER FOR COTTON OR OTHER MATERIALS.

SPECIFICATION forming part of Letters Patent No. 693,455, dated February 18, 1902.

Application filed March 11, 1901. Serial No. 50,636. (No model.)

*To all whom it may concern:*

Be it known that I, JOHN CHARLES WILLIAM STANLEY, a subject of the King of England, residing at London, England, have invented certain new and useful Improvements in Driers for Cotton or other Materials, of which the following is a specification.

My invention relates to apparatus for drying different materials, but especially constructed for drying cotton-bolls, which have heretofore been generally dried by exposing them to the air or sun and turning them over from time to time, involving a large amount of labor and great delay and very frequently failing to secure that perfect drying which is essential for the proper ginning of the cotton; and my invention consists in a structure in which there is a chute with perforate and imperforate platforms, over which perforate platforms the material is caused to pass, so as to separate the sand and earth or other particles therefrom while exposing it to currents of air passing upward through the perforated platforms, and preferably heated, as fully set forth hereinafter and as illustrated in the accompanying drawings, in which—

Figure 1 is an elevation, in section, of a drier embodying my improvement; Fig. 2, a vertical sectional elevation on the line 2 2, Fig. 1; Fig. 3, a sectional plan on the line 3 3, Fig. 1; and Fig. 4 is an elevation illustrating a modification.

In a vertical casing A is a chute, which is formed by the parallel vertical walls or sides 1 2 3 4, which may in some cases constitute the outer walls of the chute; but, as shown, they are arranged within the outer shell of the casing, so as to leave intervening compartments 7, 8, 9, and 10. From the wall 1 of the chute project inward nearly to the opposite wall 2 inclined platforms 12, which are perforated, the outer ends being the lowest and connected to reversely-inclined imperforate platforms 13, which extend back to the wall 1 and through passages *x* in the said wall, as shown in Fig. 1. Preferably there extends from the wall 2 a similar series of inclined perforated platforms 12, each of which is parallel to but a short distance from the imperforated platforms 13 of the opposite wall, so that between the two series of wedge-like hollow projections thus formed and extending from the opposite wall there is a tortuous passage *y*.

An elevator C is the means of carrying the cotton-bolls or other material to be dried upward to a hopper D, from which it falls upon the upper perforated platform 12, and then passes downward in a zigzag course to the bottom of the structure, where it falls upon the inclined or deflecting plate 15, over which it passes to the outside of the structure.

In order to properly dry the material in its passage through the structure, I provide means whereby an air-current is carried upward through the structure and in contact with the material and is preferably heated. Thus an exhaust-fan E communicates with the upper part of the chute and is the means of exhausting the air and moisture therefrom, the fresh air passing inward at the bottom opening *w* and also from the chamber 7 through the openings *x* and through the perforated platforms and the material thereon. In the structure shown in Fig. 1 fresh air will also pass inward from the chamber 10 through the openings *x*.

In order to heat the air which passes up through the perforated platforms, I may make use of any suitable heater arranged in any suitable position; but, as shown, there is a series of heating-pipes 16 below each platform 12, and these heating-pipes may receive hot air or steam. A preferable construction is to extend the said heating-pipes through the walls 3 and 4 and to introduce hot air or steam into one of the said chambers—as, for instance, into the chamber 8 through the pipe 18—the air or steam then passing through all the pipes 16 to the opposite chamber 9, from which it flows through a suitable outlet-pipe 19.

In its passage over the perforated platforms the material rolls or turns, and any sand or other particles mixed therewith will fall through the perforations of the platforms and falling onto the platforms 13 will pass through the passages *x* to the bottom of the chamber 7, where there is a rotating screw 21, which feeds the material thus extracted outward from the casing. In the apparatus shown in Fig. 1 sand and other particles will also pass through the openings *x* into the chamber 10 and from thence pass into a trough 40, in which there is a screw conveyer 41. In order that the heavy granular material, sand, or whatever it may be that is thus mixed with the material to be dried may be more effectually separated therefrom, as well as to aid in the travel of the said material over the inclined platforms 12, I prefer to agitate these platforms, and one effectual means of securing this result consists in making the walls 1 and 2 movable vertically between guide-rolls 22 and connecting the same by links 23 to eccentrics 24 on rotating shafts 25, and below the bottom of the walls I place stops 26, preferably of rubber, so that as the walls are brought suddenly downward against the stops there will be jars which will tend to dislodge the sand from the other portions of the material and cause it to fall through the perforated platforms, the rubber, however, preventing the shock from being too severe. By this means all of the platforms are simultaneously operated.

The perforated platforms need not of necessity in all cases be inclined, but may be horizontal, as shown in Fig. 4, in which case there are revolving feeders 27 for feeding the material along the platforms. In this structure there is no outer casing, and the platforms are arranged only at one side of the chute; but deflector-plates 30 project from the opposite wall.

Without limiting myself to the precise construction and arrangement of the parts shown, I claim as my invention—

1. The combination in a drier, of a chute, a chamber exterior of the chute and communicating therewith through a series of openings, a series of perforated platforms supported within the chute, a series of imperforate inclined plates supported respectively below the respective perforated platforms, said inclined plates leading at their lower ends to the said openings, means for feeding the material to be dried onto the upper platform, and means for causing said material to move to and over the successive platforms, substantially as set forth.

2. The combination in a drier, of a chute, a chamber exterior of the chute and communicating therewith through a series of openings, a series of parallel perforated platforms extending from one wall of the chute to nearly the opposite wall, a series of inclined plates extending from said opposite wall to deflect the material to be dried to the successive platforms, a series of inclined imperforate plates supported respectively below the said perforated platforms, said inclined imperforate plates leading at their lower ends to said openings, means for feeding the material to be dried to the upper platform, and means for causing said material to move from the platforms to the deflecting-plates, successively, substantially as set forth.

3. The combination in a drier, of a chute having vertical opposite sides, a series of inclined perforated platforms extending from each side nearly to the opposite side with inclined imperforate plates extending back from the outer edges of the perforated platforms to their respective supporting sides, passages for the escape of material from the imperforate plates, and means for agitating the sides supporting the perforated platforms, substantially as set forth.

In testimony whereof I have signed my name to this specification in the presence of two subscribing witnesses.

JOHN CHARLES WILLIAM STANLEY.

Witnesses:
JAMES F. O'BEIRNE,
OSCAR H. CACCIOLA.